3,475,471
π-ALLYL METAL COMPLEXES
Perry L. Maxfield, Durango, Colo., assignor to Phillips
Petroleum Company, a corporation of Delaware
No Drawing. Filed Apr. 4, 1967, Ser. No. 628,284
Int. Cl. C07f 7/22, 15/04; B01j 11/06
U.S. Cl. 260—429                                        14 Claims

ABSTRACT OF THE DISCLOSURE

Catalytically active mixed π-allyl transition metal complexes of the type (π-allyl)(L)$_a$MX$_b$, wherein M is a transition metal, (L) is a selected ligand, and X is a halide, are produced by contact of a transition metal halide with a σ-allyl metal compound, in the presence of selected ligands. The ligand can be present at the contacting or can be introduced as a previously prepared complex with the transition metal halide. The metal complexes formed have utility in catalyzing olefin reaction such as polymerization, dimerization, isomerization and the like.

BACKGROUND OF THE INVENTION

This invention relates to the production of catalysts. In one aspect, it relates to the production of a mixed π-allyl complex of a transition metal halide, that is, a transition metal halide which is complexed with a π-allyl ligand and at least one other ligand. In another aspect, it relates to a novel process for bonding a π-allyl ligand to a transition metal to form a π-allyl complex. In another aspect, it relates to a process for bonding a π-allyl group to a transition metal. In another aspect, it relates to catalysts having both a π-allyl ligand and another ligand bonded to a transition metal.

In recent years there has been a large volume of work performed in the study of π-allyl metal complexes. By π-allyl metal complexes is meant, in this application, a metal complexed with a π-allyl ligand or an alkyl-substituted π-allyl ligand. Industrially, the interest in π-allyl transition metal compounds has been stimulated by the fact that a number of these compounds have been found to catalyze olefin reactions such as polymerization, dimerization, isomerization, and the like.

The π-allyl complexes of transition metals have been prepared in a number of different ways. Generally, different procedures are required to form the complexes of the different transition metals. For example, π-allyl complexes of iron have been prepared by the reaction of allyl halides with iron pentacarbonyl. Allyl alcohol has also been used to prepare the π-allyl complexes of palladium from suitable palladium salts. Still another technique has been to react a suitable salt, such as nickel dichloride, with an allyl Grignard reagent, such as allylmagnesium chloride.

These prior art methods of production of the various π-allyl complexes of transition metals suffer from several disadvantages. For example, certain of the reactions require the use of toxic metal carbonyls. Other methods require the use of the difficult-to-handle Grignard reagents. Furthermore, different methods are necessary for use with the different transition metals.

SUMMARY OF THE INVENTION

My invention is the production of mixed π-allyl transition metal halide complexes by reacting a σ-allyl metal reagent with a transition metal halide containing a ligand. This ligand may be bonded to the transition metal atom either prior to its contact with the σ-allyl metal reagent, or simultaneously therewith.

The process of my invention accomplishes the object of providing a single process for formation of a mixed π-allyl metal complex regardless of the transition metal used. It further accomplishes the object of preparing π-allyl transition metal compounds without the use of metal carbonyls or Grignard reagents. It further accomplishes the object of providing a convenient one-step reaction for the preparation of mixed π-allyl transition metal complexes. It further accomplishes the object of providing a new method for preparing catalysts for various olefin reactions.

DESCRIPTION OF THE PREFERRED EMBODIMENTS

According to the preferred embodiments of my invention, I form a mixed π-allyl transition metal halide complex of the type (π-allyl)(L)$_a$MX$_b$ by reacting a σ-allyl metal reagent with a transition metal halide in the presence of another ligand.

The σ-allyl metal reagents which are used in the present invention are those which correspond to the formula

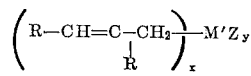

wherein R is a hydrogen or methyl radical; Z is chlorine, bromine, or iodine; M' is a metal selected from tin, lead, and germanium; x is a number from 1 to 4; y is a number from 0 to 3; and the sum of x and y is a number corresponding to the valence of M'.

Specific examples of the σ-allyl metal reagents which are useful in the practice of my invention are: tetraallyltin, tetraallyllead, tetracrotyltin, tetramethallyllead, tetraallylgermanium, tetracrotyllead, triallyltin chloride, trimethyllylgermanium bromide, tetrakis(2-methyl-2-butenyl)tin, tetracrotylgermanium, triallylgermanium iodide, tetramethallyl tin, and the like, and mixtures thereof.

It is also within the scope of this invention to substitute for the σ-allyl metal reagent, the precursors of that reagent, such that the reagent is formed in situ. For example, the tetraallyltin reagent can be substituted with an equivalent amount of an allyl halide and powdered tin metal, or an allyl halide and stannous chloride, or allyl halide, stannic chloride and aluminum powder.

The transition metal halides which are preferably applicable in the present invention are represented by the formula $$M(L)_mX_n$$

wherein M is any one of the transition metals found in Groups I–B, III–B, IV–B, V–B, VI–B, VII–B and VIII of the Periodic Table of the elements appearing in the Handbook of Chemistry and Physics of the Chemical Rubber Company, 45th edition (1964); X is chlorine, bromine, iodine, or hydrogen, at least one halogen being present; L is one or more ligands represented by the following:

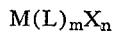

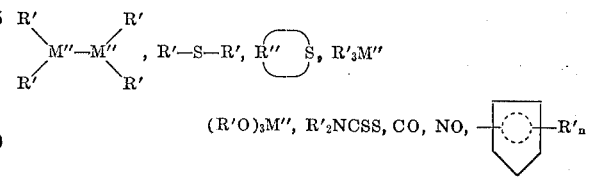

as well as monoolefins having up to about 20 carbon atoms, chelating diolefins selected from 1,5-cyclooctadiene, dicyclopentadiene, and norbornadiene, and aromatic and aliphatic tertiary monoamines and chelating diamines having up to about 20 carbon atoms per molecule, such as triethylamine, 3-(diethylamino)propylamine, N,N'-diethylethylenediamine, 2-aminopyridine, N,N'-dibenzylethylenediamine, 2,2'-bipyridyl, N,N,N',N'-tetramethylethylenediamine; wherein M" is selected from phosphorus arsenic and antimony, and R' is selected from aromatic and saturated aliphatic hydrocarbon radicals having up to about 20 carbon atoms per molecule and halo and hydrocarboxy derivatives thereof; R" is saturated or unsaturated having from 4 to 7 carbon atoms; and $m$ is a number from 0 to 4 and $n$ is a number from 1 to 3 depending upon the valence and/or coordination ability of the specific transition metal used and the specific ligand attached. Some complexed salts may exist in polynuclear or polymeric forms such as dimers. The preferred transition metals are: nickel, palladium, ruthenium, rhodium, iron, iridium, platinum, rhenium asmium, chromium titanium, vanadium, molybdenum.

Some transition metal halide compounds falling within the generic formulas given above are: bis(1,5-cyclooctadiene)dichlorodirhodium, tetracarbonyldiiodoiron, tris-(triphenylphosphine)chlororhodium, hexakis(triphenylphosphine)tetrachlorodiruthenium, bis(tributylphosphine)carbonylchloroiridium, cyclopentadienyltrichlorotitanium, hexanitrosyltetrachlorodivanadium, tris(butyl sulfide)bromopalladium, tris(thiophene)chloronickel, tribenzylarsenite(diethyldithiocarbamato)iodonickel, and the like, and mixtures thereof.

It is, as shown above, also within the scope of the present invention to use non-complexed transition metal halide salts. However, when using such non-complexed salts, it is preferred that a ligand corresponding to the ligands described in preceding paragraphs be present at the time of contact of the salt with the σ-allyl metal reagent. Thus, such simple halide salts as $NiBr_2$, $PdCl_2$, $RuCl_3$, $IrI_3$, $FeCl_3$, $CoBr_2$, $PtI_2$, $ReCl_3$, $OsCl_3$, $MnBr_2$, $CrI_3$, $K_2PtCl_4$, and the like can be used in the presence of a ligand-forming material. Examples of ligands are: triphenylphosphine, tributylphosphine, teramethyldiphosphine, tribenzylarsine, tris(4 - trifluoromethylphenyl)stibine, trimethylarsenite, nitric oxide, thiophene, pyridine, p-tolyl sulfide, and the like, and mixtures thereof.

The proportions of ligand and metal salt in this embodiment of the invention will generally range from about 1 to about 4 moles of ligand for each atom of metal in the metal salt depending upon the coordination capacity of the specific ligand and the metal of the metal salt. However, proportions both above and below this range can be used, sacrificing only reagent efficiency and, perhaps, the ease of subsequent product isolation, if such isolation is desired.

According to the process of the present invention, the π-allyl complex compounds are prepared by mixing the transition metal halide salt, the σ-allyl metal reagent, and the ligand (when using the embodiment wherein the transsition metal salt is not already complexed) at a temperature within the range of from about —50 to about 130° C., preferably to about 60° C., for a time in the range of from a few seconds up to about 24 hours, preferably in the presence of a diluent in which the components of the reaction zone are at least partially soluble. Any convenient diluent such as tetrahydrofuran, methylene chloride, benzene, chlorobenzene, and the like can be used for this purpose. Any order of addition can be used in the contact of these reagents except that the σ-allyl reagent should not be contacted with the transition metal salt unless he ligand is already present.

After the reaction period, the product can be isolated and purified, if desired, by any conventional means. For example, the reaction diluent can be evaporated and the reaction residue extracted and/or washed with other solvents. The products are generally crystalline, although, in some cases, they may be in the form of an oil. Where the π-allyl transition metal complex is to be used as a catalyst in a hydrocarbon conversion, the product need not be isolated from its reaction mixture but the entire reaction mixture can be employed in the hydrocarbon conversion process.

The mixed π-allyl transition metal halide complexes, which are the products of this invention, are represented by the formula $$(\pi\text{-allyl})(L)_aMX_b$$

wherein (π-allyl) is an allylic radical π-bonded to transition metal atom M and which is represented by $(CHR—CR—CH_2)$ in which R is hydrogen or methyl; $a$ is 1 to 4 and $b$ is 0 to 2 depending upon the valence and/or coordination ability of the transition metal and the ligand (L); and (L), M and X are as defined earlier. Some complexes can be in polynuclear or polymeric forms such as dimers.

The invention is further illustrated by the following examples.

Example 1

Preparation of π - allyl(triphenplphosphine)bromonickel.—A mixture of 5.2 g. of triphenylphosphine, 4.4 g. of anhydrous nickel bromide, 2.1 ml. of tetraallyltin, 15 ml. benzene, and 3 ml. tetrahydrofuran was stirred at room temperature for 4 hours in a sealed, nitrogen-purged glass reactor. The solvent was then removed by evaporation under a stream of nitrogen gas and the reaction mixture was extracted with 10 ml. of warm ether. The crystals of π-allyl(triphenylphosphine)bromonickel which remained were found, after wiping to remove some residual oil, to melt at 140–142° C. In another similar run the yield was 5.1 g. (58% yield) of the orange oil which deposited some crystals of the product.

Example 2

Preparation of π - allyl(tributylphosphine)bromonickel.—A mixture of 8.8 g. of anhydrous nickel bromide, 4.9 ml. (8.0 g.) of tributylphosphine, 4.2 ml. of tetraallyltin, and 20 ml. benzene was stirred for 2 hours as in Example 1.

The solvent was removed from the reaction mixture by a nitrogen stream and the oily residue was extracted with 30 ml. of a 1:1 mixture of ether and pentane. Evaporation of the solvent from the extract gave 9.1 g. (60%) of π-allyl(tributylphosphine)bromonickel in the form of a heavy red oil.

Example 3

Preparation of π - allyl(triphenylphosphine)chloropalladium.—Using the same general procedure as that described in Example 1, a mixture of 0.36 g. of anhydrous palladium dichloride, 0.52 g. of triphenylphosphine, 0.25 ml. of tetraallyltin, and 5 ml. of dry tetrahydrofuran was stirred for 2 hours at room temperature and then allowed to stand overnight. The reaction mixture was decanted, centrifuged, and the resulting liquid was evaporated under reduced pressure to give a heavy orange oil which slowly deposited crystals of π-allyl(triphenylphosphine)chloropalladium. The orange crystals melted at 150–160° C., after washing rapidly with tetrahydrofuran.

Example 4

Preparation of π - allyl(triphenylarsine)chloropalladium.—In a manner essentially identical with that of Example 3, 0.18 g. of palladium dichloride, 0.30 g. of triphenylarsine, and 0.25 ml. of tetraallyltin were stirred for 2 hours together with 5 ml. of tetrahydrofuran at room temperature. A yield of 0.15 g. of π-allyl(triphenylarsine)chloropalladium in the form of yellow crystals melting at 76–78° C. was obtained.

Example 5

Preparation of π - allyltris(triphenylphosphine)chlororuthenium.—A mixture of 1.0 g. of ruthenium chloride monohydrate, 3.0 g. of triphenylphosphine, and 1 ml. of of tetraallyltin was stirred with 10 ml. dry benzene and 10 ml. dry tetrahydrofuran for 3 hours at room temperature. The reaction mixture was filtered and about ⅔ of the liquid was evaporated under nitrogen atmosphere. The concentrated liquid was allowed to stand overnight from which yellow crystals of π-allyltris(triphenylphosphine)chlororuthenium were obtained. About 3 g. of the crystals were isolated and were found to decompose at 180–190° C.

Example 6

Other examples of mixed transition metal complexes.—In a manner essentially identical to that of the previous examples, a number of other transition metal halides and transition metal halide complexes are reacted with tetraallyltin to produce the mixed π-allyl transition metal complexes of the present invention. Except where indicated, essentially equimolar quantities of the reagents are reacted.

(A) The dimer of 1,5-cyclooctadienechlororhodium is reacted with tetraallyltin in a tetrahydrofuran diluent to produce a deep orange reaction mixture containing π-allyl(1,5-cyclooctadiene)rhodium.

(B) The monohydrate of rhodium trichloride is reacted in tetrahydrofuran with triphenylphosphine (2 moles) and tetraallyltin to yield a yellow reaction mixture containing π-allylbis(triphenylphosphine)dichlororhodium.

(C) Nickel bromide (2 moles), tetraethyldiphosphine, and tetraallyltin are reacted in tetrahydrofuran to produce an orange solution of di-π-allyl(tetraethyldiphosphine)dibromodinickel.

(D) Palladium dichloride, triphenylstibine, and tetraallyltin are reacted in tetrahydrofuran to produce a light yellow solution of π-allyl(triphenylstibine)chloropalladium.

(E) Palladium dichloride, thiophene, and tetraallyltin are reacted, using tetrahydrofuran as diluent, to yield a dark brown reaction mixture containing π-allyl(thiophene)chloropalladium.

(F) Palladium dichloride, phenyl sulfide, and tetraallyltin are reacted in tetrahydrofuran to yield a dark brown reaction mixture containing π-allyl(phenyl sulfide)chloropalladium.

(G) Palladium dichloride, butyl sulfide, and tetraallyltin are reacted in tetrahydrofuran to give a dark brown reaction mixture containing π-allyl(butyl sulfide)chloropalladium.

(H) Palladium dichloride, pyridine, and tetraallyltin are reacted in tetrahydrofuran to yield a dark brown reaction mixture containing π-allyl-(pyridine)chloropalladium.

(I) Palladium dichloride, 1,5-cyclooctadiene, and tetraallyltin are reacted in tetrahydrofuran to yield a dark brown reaction mixture containing π-allyl(1,5-cyclooctadiene)chloropalladium.

(J) Tetracarbonyldiiodoiron is reacted with tetraallyltin in benzene solution to yield a red-orange solution of π-allyl(tricarbonyl)iodoiron.

(K) Tris(triphenylphosphine)chlororhodium is reacted with tetraallyltin in benzene solution to yield yellow crystals of π-allylbis(triphenylphosphine)chlororhodium.

(L) Hexakis(triphenylphosphine)tetrachlorodiruthenium is reacted with tetraallyltin to produce yellow crystals of π-allyltris(triphenylphosphine)chlororuthenium.

(M) Tris(triphenylphosphine)dihydrochloroiridium is reacted with tetraallyltin in benzene solution to yield yellow crystals of π-allyltris(triphenylphosphine)iridium.

(N) Bis(triphenylphosphine)carbonylchloroiridium is reacted with tetraallyltin in benzene solution to yield yellow crystals of π-allylbis(triphenylphosphine)carbonyliridium.

(O) The monohydrate of iridium trichloride is reacted with triphenylphosphine and tetraallyltin in tetrahydrofuran solution to yield yellow crystals of π-allylbis(triphenylphosphine)chloroiridium.

(P) Platinum diiodide, triphenylphosphine, and tetraallyltin are reacted in benzene solution to yield light orange crystals of π-allyl(triphenylphosphine)iodoplatinum.

(Q) Rhenium trichloride, triphenylphosphine, and tetraallyltin are reacted in a tetrahydrofuran solution to yield a dark red solution of π-allyl(triphenylphosphine)chlororhenium.

(R) Osmium trichloride, triphenylphosphine (3 moles), and tetraallyltin are reacted in tetrahydrofuran solvent to yield yellow crystals of π-allyltris(triphenylphosphine)chloroosmium.

(S) Iron trichloride, nitric oxide (2 moles), and tetraallyltin are reacted in tetrahydrofuran solvent to yield a dark orange reaction mixture containing π-allyldinitrosylchloroiron.

(T) Chromium trichloride, tributylphosphine, and tetraallyltin are reacted in tetrahydrofuran solvent to yield a green solution of a π-allyl(tributylphosphine)chlorochromium.

(U) Cyclopentadienyltrichlorotitanium, tributylphosphine, and tetraallyltin are reacted in tetrahydrofuran solvent to yield a light yellow solid of a π-allylcyclopentadienylchlorotitanium.

(V) A polymeric form of trinitrosyldichlorovanadium and tetraallyltin are reacted in tetrahydrofuran solvent to yield a brown reaction mixture containing π-allyl(trinitrosyl)chlorovanadium.

(W) Potassium chloroplatinite, triphenylphosphine, and tetraallyltin are reacted in tetrahydrofuran solvent to yield orange crystals of π-allyl(triphenylphosphine)chloroplatinum.

(X) A polymeric form of dinitrosylchloromolybdenum, triphenylphosphine, and tetraallyltin are reacted in benzene solvent to yield a yellow solution of π-allyldinitrosyl(triphenylphosphine)chloromolybdenum.

(Y) A polymeric form of dinitrosylchloromolybdenum, tributylphosphine, and tetraallyltin are reacted in benzene solvent to yield a yellow-brown solution of π-allyldinitrosyl(tributylphosphine)chloromolybdenum.

I claim:

1. Process of producing a π-allyl metal complex by a one-step reaction comprising reacting a σ-allyl metal compound having the formula

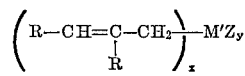

wherein R is selected from hydrogen and methyl; Z is selected from chlorine, bromine, and iodine; M' is selected from tin, lead, and germanium; $x$ is a number from 1 to 4; and $y$ is a number from 0 to 3 with a transition metal halide and a ligand, said ligand being present when said metal compound and said transition metal halide are initially contacted to cause said reacting.

2. Process of producing a π-allyl metal complex comprising reacting a σ-allyl metal compound having the formula

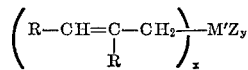

wherein R is selected from hydrogen and methyl; Z is selected from chlorine, bromine, and iodine; M' is selected from tin, lead, and germanium; $x$ is a number from 1 to 4; and $y$ is a number from 0 to 3 with a transition metal halide and a ligand, said ligand being present when said metal compound and said transition metal halide are initially contacted to cause said reacting, with the further proviso that said transition metal halide and said ligand are interreacted prior to reacting with said σ-allyl metal compound.

3. Process of claim 1 wherein said σ-allyl metal compound has the formula

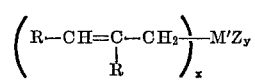

wherein R is selected from hydrogen and methyl; Z is selected from chlorine, bromine, and iodine; M' is selected from tin, lead, and germanium; $x$ is a number from 1 to 4; and $y$ is 0.

4. Process of claim 3 wherein M' is tin.

5. The process of claim 1 wherein said σ-allyl compound is tetraallyltin.

6. Process of claim 1 wherein said transition metal is selected from nickel, palladium, ruthenium, rhodium, iron, iridium, platinum, rhenium, osmium, chromium, titanium, vanadium, and molybdenum.

7. Process of claim 1 wherein said ligand is selected from: triphenylphosphine, tributylphosphine, tetramethyldiphosphine, tribenzylarsine, tris(4-trifluoromethylphenyl)stibine, trimethylarsenite, nitric oxide, thiophene, pyridine, p-tolyl sulfide, 1,5-cyclooctadiene, butyl sulfide, phenyl sulfide, triphenylstibine, tetraethyldiphosphine, triphenylarsine.

8. Process of claim 1 wherein said σ-allyl metal compound is tetraallyltin, said transition metal halide is selected from nickel bromide, palladium dichloride, ruthenium trichloride, rhodium trichloride, iridium trichloride, platinum diiodide, rhenium trichloride, osmium trichloride, iron trichloride, chromium trichloride, and potassium chloroplatinite, and said ligand is selected from triphenylphosphine, tributylphosphine, triphenylarsine, tetraethyldiphosphine, triphenylstibine, thiophene, phenyl sulfide, butyl sulfide, pyridine, 1,5-cyclooctadiene, and nitric oxide.

9. Process of claim 2 wherein said σ-allyl compound is tetraallyltin and the reaction product of said transition metal halide and said ligand has the formula $$M(L)_m X_n$$

wherein M is any one of the transition metals found in Groups I-B, III-B, IV-B, V-B, VI-B, VII-B, and VIII, X is chlorine, bromine, iodine, or hydrogen, at least one halogen being present; L is one or more ligands represented by the following:

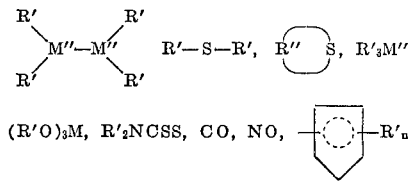

monoolefins having up to about 20 carbon atoms, chelating diolefins selected from 1,5-cyclooctadiene, dicyclopentadiene, and norbornadiene, and aromatic and aliphatic tertiary monoamines and chelating diamines having up to about 20 carbon atoms per molecule; wherein M″ is selected from phosphorus, arsenic and antimony; and R′ is selected from aromatic and saturated aliphatic hydrocarbon radicals and halo and hydrocarboxy derivatives thereof; R″ is a saturated or ethylenically unsaturated divalent hydrocarbyl radical having from 4 to 7 carbon atoms; m is an integer from 0 to 4; and n is an integer from 1 to 3.

10. Process of claim 2 wherein the reaction product of said transition metal halide and said ligand-forming material is selected from:

bis(1,5-cyclooctadiene)dichlorodirhodium
tetracarbonyldiiodoiron
tris(triphenylphosphine)chlororhodium
hexakis(triphenylphosphine)tetrachlorodiruthenium
bis(tributylphosphine)carbonylchloroiridium
cyclopentadienyltrichlorotitanium
hexanitrosyltetrachlorodivanadium
tris(butyl sulfide)bromopalladium
tris(thiophene)chloronickel
tribenzylarsenite(diethyldithiocarbamato)iodonickel and mixtures thereof.

11. Process of claim 2 wherein said σ-allyl metal reagent is tetraallyltin, and the reaction product of said transition metal halide and said ligand is selected from:

bis(1,5-cyclooctadiene)dichlorodirhodium
tetracarbonyldiiodoiron
tris(triphenylphosphine)chlororhodium
hexakis(triphenylphosphine)tetrachlorodiruthenium
tris(triphenylphosphine)dihydrochloroiridium
bis(triphenylphosphine)carbonylchloroiridium
cyclopentadienyltrichlorotitanium, polymeric forms of trinitrosyldichlorovanadium and polymeric forms of dinitrosylchloromolybdenum.

12. A process according to claim 1 wherein:
(a) said σ-allyl metal compound is tetraallyltin,
(b) said transition metal halide is nickel bromide, palladium dichloride, or ruthenium chloride monohydrate,
(c) said ligand is triphenylphosphine, and wherein said reacting results in π-allyl(triphenylphosphine)bromonickel, π-allyl(triphenylphosphine)chloropalladium and π-allyltris(triphenylphosphine)chlororuthenium, respectively, said reacting being conducted in at least one of benzene and tetrahydrofuran.

13. A process according to claim 1 for the production of π-allyl(triphenylarsine)chloropalladium wherein said σ-allyl metal compound is tetraallyltin, said transition metal halide is palladium dichloride and said ligand is triphenylarsine, said reacting being conducted in tetrahydrofuran.

14. A process according to claim 1 for the production of π-allyl(tributylphosphine)bromonickel wherein said σ-allyl metal compound is tetraallyltin, said transition metal halide is nickel bromide and said ligand is tributylphosphine, said reacting being conducted in benzene.

References Cited

UNITED STATES PATENTS 3,379,706  4/1968  Wilke _____ 260—943

FOREIGN PATENTS 631,172  11/1963  Belgium.

OTHER REFERENCES

Wilke et al.: Angew. Chem. (International edition) vol. 5 (1966), pp. 151–157.

Heck et al.: Chem. and Ind. (London), July 1, 1961, pp. 986–7.

TOBIAS E. LEVOW, Primary Examiner

A. P. DEMERS, Assistant Examiner

U.S. Cl. X.R.

252—431; 260—270, 271, 290, 329, 429.1, 429.2, 429.3, 429.5, 430, 438.1, 438.5